July 26, 1927.
A. A. REES
1,637,010
GAME APPARATUS
Filed July 14, 1926
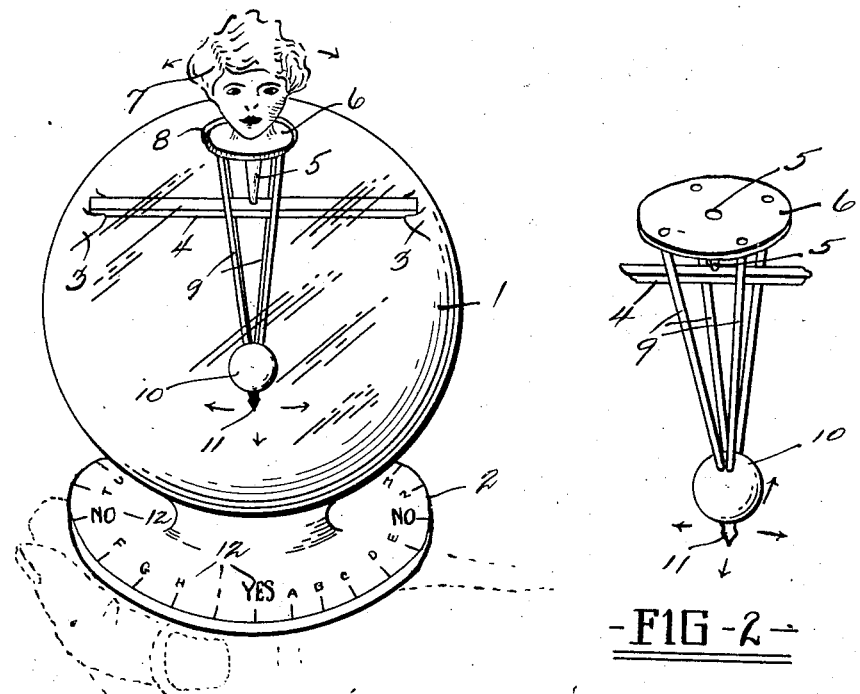
-FIG-1-
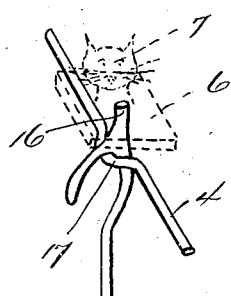
-FIG-2-
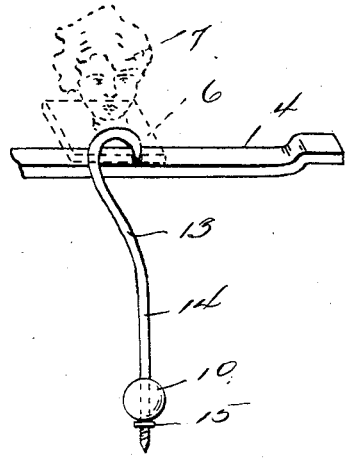
-FIG-3-
-FIG-4-
INVENTOR.
ALFRED A. REES,
BY
ATTORNEY.

Patented July 26, 1927.

1,637,010

UNITED STATES PATENT OFFICE.

ALFRED ARNOLD REES, OF NEW HAVEN, CONNECTICUT.

GAME APPARATUS.

Application filed July 14, 1926. Serial No. 122,399.

My present invention has reference to game apparatus of the type described in my prior Patent #1,514,260 granted November 4th 1924, and more particularly it is my purpose to improve upon mechanical means for giving physical expression to the processes of the conscious or sub-conscious mind. As described in my Patent #1,514,260, mental processes in the absence of any positive medium of expression, will reveal themselves by association with certain symbols. The trend of a person's conscious or sub-conscious mind will, for instance, be revealed in an attraction for, or an aversion to, certain symbols suggestive of the trend of thought. It has also been demonstrated that the mental processes of one person may be communicated to a medium which is passive, as for instance, to a person who is in a mentally passive state. In my prior patent, above referred to, the medium of expression is a simple pendulum designed to be held in the hand over a dial having thereon various symbols. It has been found that a person holding the pendulum would influence its action through unconscious physical movement of the hand induced by the trend of conscious or sub-conscious thought, to cause the pendulum to designate certain of the symbols which have a relation to the trend of thought, thereby giving expression to the same. So also has it been found that two persons, one active and the other passive, and the latter holding the pendulum and in contact with the former, would cause the pendulum to operate in such a manner as to interpret the conscious and sub-conscious mind of the active agent.

My present device differs from the device of my prior patent, above identified, in the mechanical means whereby interpretation is effected. I have herein described a unitary device which may be held in the hand and which embodies both the dial and the pendulum, and which has other mechanical improvements designed to lend to its attractiveness as a practical and interesting game. The pendulum is so formed, for instance, that it carries a figure, as for instance a woman's head, and is weighted and mounted in a transparent housing, such as a globe, upon the base of which is the dial bearing the symbols. Accordingly as the pendulum swings toward or away from the symbols on the dial the head will nod or move after the nature of a person to whom questions are addressed. The dial is designed to be grasped by the hand and the whole device so supported to be influenced by the movement of the hand or arm of the operator to interpret the trend of his conscious or sub-conscious thought.

The mechanical formation of my pendulum is subject to considerable modification provided it be mounted on the support for substantially universal movement so that it can swing in a circle. So also is my housing (the globe and dial) subject to considerable modification provided it can be supported bodily by the hand of an operator. For instance, a frame may be substituted for the globe.

Not only is my device applicable for use as a game, but it may be used to stimulate the memory, to recall forgotten names and dates, for use by psycho-analysts in compiling records, to detect criminal tendencies or reveal crimes already perpetrated, and for educational purposes. To these and other ends, my invention consists in the construction, arrangement and combination of elements described hereinafter and pointed out in the claims forming a part of this specification.

One embodiment and several modifications of my invention are represented by way of example in the accompanying drawings, wherein:—

Figure 1 is an assembly view,

Figure 2 is a perspective view of the preferred form of my pendulum and support, Figure 3 is a modified form of my pendulum, and Figure 4 is also a view of a modified form of my pendulum.

In the drawings, in which like characters of reference are used to designate like or similar parts throughout the several views;—

The numeral (1) designates a transparent, or glass, globe or sphere having a circular base (2). The interior of the globe adjacent the top thereof is formed with integral diametrically opposed lugs forming seats (3) for supporting horizontally within the globe a cross bar (4). The bar (4) is drilled or depressed intermediate of its length, and in line with the vertical axis of the globe to receive the needle point of a pin (5) fixed centrally in a plate (6) upon which is carried an attractive figure such as a woman's head (7). The globe has an opening (8) in its top within which the plate is supported. A plurality of rods (9) or the like are attached to the plate (6) and converge to a substantially common point where they are connected with a weight (10) to which is fixed a needle (11). The weight (10), needle (11), rods (9), plate (6) and head (7) constitute my pendulum which is supported for swinging movement upon the bar (4) by the pin (5). The annular edge of the base (2) is graduated and has cut, painted, or the like, thereon certain symbols (12). These may be the letters of the alphabet, and Yes and No, or any other symbols which might be used to interpret and express thought. The entire device is designed to be supported in the hand of an operator, the hand being indicated by dotted lines at (X), and the movement of the hand under control of the conscious or sub-conscious mind will cause the pendulum to swing toward certain of the symbols having a relationship to the trend of thought of the operator. The head of course will move, or nod; resembling in certain of its movements, the natural movements of a human head in answer to certain questions, as Yes or No. The person holding my device, or the operator, is asked questions, to which my device is designed to respond unconsciously thereby affording amusement; or the device may be held by a passive person in contact with the person to whom questions are asked with a like result.

In Figure 3, a modified form is shown in which the plate (6), shown in dotted lines, is supported on a standard (13) the general curvature of which resembles a question-mark. The weight (10) is carried on the straight shank (14) of the standard, and such shank (14) has its end inserted therethrough and fastened thereon by means of a nut (15). The form shown in Figure 4 resembles a shepherd's hook, with the staff supporting the weight and the crook extending about the bar (4) to afford the desired swinging movement. The plate (6) shown in dotted lines is carried on the lug (16) on the hook. The bar in this case is formed with a bend (17) to prevent creeping or displacement of the pendulum lengthwise of the bar. It is here pointed out that many figures may be substituted for the head (7), such for instance as a cat's head or an owl's head, or the like.

While in the foregoing there has been illustrated and described such combination and arrangement of elements as constitute the preferred embodiments of my invention, it is nevertheless desired to emphasize the fact that interpretation of the invention should only be conclusive when made in the light of the subjoined claims.

I claim:—

1. In a device of the character described, a support designed to be influenced by the movement of an operator's hand, a pendulum mounted on the support, a member carried by the pendulum and extending above the support to respond to movement of the pendulum, and a dial bearing symbols toward which the pendulum is adapted to swing under the influence of the movement of the operator's hand.

2. In a device of the character described, a frame having a dial bearing symbols and which is designed to be bodily supported by an operator's hand, a support in the frame, a pendulum carried by the support and adapted to swing within the frame toward the symbols on the dial under the influence of movement of the operator's hand and a member carried by the pendulum above the support and rising above the frame to respond to movement of the pendulum.

3. In a device of the character described, a frame having a dial bearing symbols and which is designed to be bodily supported by an operator's hand, a support carried within the frame, a pendulum carried by the support and adapted to swing to designate certain of the symbols on the dial, and a plate carried by the pendulum above the support, said plate adapted to have secured thereto a figure rising above the frame and responding to movement of the pendulum.

4. In a device of the character described, a transparent globular member having a circular base bearing symbols about its edge, said member and base adapted to be supported by the hand of an operator, a support in the member, and a pendulum on the support and adapted to be swung to designate certain of the symbols on the dial.

5. In a device of the character described, a transparent member having a base bearing symbols on its edge, said member and base adapted to be supported by the hand of an operator, a support in the member, and a pendulum on the support and adapted to be swung to designate certain of the symbols on the dial.

6. In a device of the character described, a hollow globular member having an opening at its top, and provided with a circular base having symbols around its upper edge, said member and base being formed of transparent material, a support mounted within the member, a pendulum adapted to be mounted on the support within the member and adapted to be swung to designate certain of the symbols on the base, a plate on the pendulum disposed to be arranged within the opening in the top of the globular member, and a symbolic figure mounted on the plate and adapted to be influenced in its movement by the movement of the pendulum.

In testimony whereof, I affix my signature hereunto.

ALFRED ARNOLD REES.